(12) United States Patent
Hong et al.

(10) Patent No.: US 10,674,530 B2
(45) Date of Patent: Jun. 2, 2020

(54) METHOD AND APPARATUS FOR PROCESSING BUFFER STATUS REPORT FOR NEXT-GENERATION MOBILE COMMUNICATION

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 10 days.

(21) Appl. No.: 15/988,429

(22) Filed: May 24, 2018

(65) Prior Publication Data
US 2018/0352566 A1 Dec. 6, 2018

(30) Foreign Application Priority Data

May 31, 2017 (KR) .................. 10-2017-0068073
Jan. 4, 2018 (KR) .................. 10-2018-0001016

(51) Int. Cl.
| H04L 12/28 | (2006.01) |
| H04W 72/12 | (2009.01) |
| H04L 1/00 | (2006.01) |
| H04W 24/10 | (2009.01) |
| H04W 28/02 | (2009.01) |

(52) U.S. Cl.
CPC ......... *H04W 72/1284* (2013.01); *H04L 1/003* (2013.01); *H04L 1/0027* (2013.01); *H04L 1/0029* (2013.01); *H04W 24/10* (2013.01); *H04W 28/0278* (2013.01); *H04W 72/1242* (2013.01)

(58) Field of Classification Search
CPC .... H04L 47/10; H04L 5/0007; H04W 72/048; H04W 56/0015; H04W 72/1215; H04W 72/0453; H04W 72/1284; H04W 72/0406
See application file for complete search history.

(56) References Cited

U.S. PATENT DOCUMENTS

| 7,769,926 | B2 * | 8/2010 | Wu | H04W 72/1284 |
| | | | | 370/330 |
| 8,897,238 | B2 * | 11/2014 | Park | H04L 47/10 |
| | | | | 370/329 |
| 9,042,320 | B2 * | 5/2015 | Kim | H04L 5/001 |
| | | | | 370/329 |
| 9,559,923 | B2 * | 1/2017 | Tesanovic | H04L 43/0817 |
| 2012/0099452 | A1 | 4/2012 | Dai et al. | |

OTHER PUBLICATIONS

Samsung, "BSR for Multiple Numerology Operation", R2-1705057, 3GPP TSG-RAN WG2 NR#98, Hangzhou, China, May 15-19, 2017, pp. 1-3.

* cited by examiner

*Primary Examiner* — Hanh N Nguyen
(74) *Attorney, Agent, or Firm* — IP Legal Services, LLC

(57) ABSTRACT

Provided is a method for transmitting, by a terminal, a Buffer Status Report (BSR). The method includes: monitoring whether a regular BSR or a periodic BSR is triggered; determining that a BSR format is a long BSR when there is data available for uplink transmission in one or more Logical Channel Groups (LCGs); and transmitting, to a base station, a BSR for all LCGs having the data available for uplink transmission, which is configured in the long BSR format, when the regular BSR or the periodic BSR is triggered, and an apparatus thereof.

9 Claims, 15 Drawing Sheets

Short BSR/truncated BSR MAC control element format

Long BSR MAC control element format

FIG.8

| LCG7 | LCG6 | LCG5 | LCG4 | LCG3 | LCG2 | LCG1 | LCG0 | Oct 1 |
|---|---|---|---|---|---|---|---|---|
| Buffer Size 2 ||||||||| Oct 2 |
| Buffer Size 4 ||||||||| Oct 3 |
| Buffer Size 6 ||||||||| Oct 4 |

FIG. 9

| Index | BS value | Index | BS value | Index | BS value | Index | BS value |
|---|---|---|---|---|---|---|---|
| 0 | 0 | 64 | ≤ 526 | 128 | ≤ 29431 | 192 | ≤ 1647644 |
| 1 | ≤ 10 | 65 | ≤ 560 | 129 | ≤ 31342 | 193 | ≤ 1754595 |
| 2 | ≤ 11 | 66 | ≤ 597 | 130 | ≤ 33376 | 194 | ≤ 1868488 |
| 3 | ≤ 12 | 67 | ≤ 635 | 131 | ≤ 35543 | 195 | ≤ 1989774 |
| 4 | ≤ 13 | 68 | ≤ 677 | 132 | ≤ 37850 | 196 | ≤ 2118933 |
| 5 | ≤ 13 | 69 | ≤ 720 | 133 | ≤ 40307 | 197 | ≤ 2256475 |
| 6 | ≤ 14 | 70 | ≤ 767 | 134 | ≤ 42923 | 198 | ≤ 2402946 |
| 7 | ≤ 15 | 71 | ≤ 817 | 135 | ≤ 45709 | 199 | ≤ 2558924 |
| 8 | ≤ 16 | 72 | ≤ 870 | 136 | ≤ 48676 | 200 | ≤ 2725027 |
| 9 | ≤ 17 | 73 | ≤ 926 | 137 | ≤ 51836 | 201 | ≤ 2901912 |
| 10 | ≤ 18 | 74 | ≤ 987 | 138 | ≤ 55200 | 202 | ≤ 3090279 |
| 11 | ≤ 19 | 75 | ≤ 1051 | 139 | ≤ 58784 | 203 | ≤ 3290873 |
| 12 | ≤ 20 | 76 | ≤ 1119 | 140 | ≤ 62599 | 204 | ≤ 3504487 |
| 13 | ≤ 22 | 77 | ≤ 1191 | 141 | ≤ 66663 | 205 | ≤ 3731968 |
| 14 | ≤ 23 | 78 | ≤ 1269 | 142 | ≤ 70990 | 206 | ≤ 3974215 |
| 15 | ≤ 25 | 79 | ≤ 1351 | 143 | ≤ 75598 | 207 | ≤ 4232186 |
| 16 | ≤ 26 | 80 | ≤ 1439 | 144 | ≤ 80505 | 208 | ≤ 4506902 |
| 17 | ≤ 28 | 81 | ≤ 1532 | 145 | ≤ 85730 | 209 | ≤ 4799451 |
| 18 | ≤ 30 | 82 | ≤ 1631 | 146 | ≤ 91295 | 210 | ≤ 5110989 |
| 19 | ≤ 32 | 83 | ≤ 1737 | 147 | ≤ 97221 | 211 | ≤ 5442750 |
| 20 | ≤ 34 | 84 | ≤ 1850 | 148 | ≤ 103532 | 212 | ≤ 5796046 |
| 21 | ≤ 36 | 85 | ≤ 1970 | 149 | ≤ 110252 | 213 | ≤ 6172275 |
| 22 | ≤ 38 | 86 | ≤ 2098 | 150 | ≤ 117409 | 214 | ≤ 6572925 |
| 23 | ≤ 40 | 87 | ≤ 2234 | 151 | ≤ 125030 | 215 | ≤ 6999582 |
| 24 | ≤ 43 | 88 | ≤ 2379 | 152 | ≤ 133146 | 216 | ≤ 7453933 |
| 25 | ≤ 46 | 89 | ≤ 2533 | 153 | ≤ 141789 | 217 | ≤ 7937777 |
| 26 | ≤ 49 | 90 | ≤ 2698 | 154 | ≤ 150992 | 218 | ≤ 8453028 |
| 27 | ≤ 52 | 91 | ≤ 2873 | 155 | ≤ 160793 | 219 | ≤ 9001725 |
| 28 | ≤ 55 | 92 | ≤ 3059 | 156 | ≤ 171231 | 220 | ≤ 9586039 |
| 29 | ≤ 59 | 93 | ≤ 3258 | 157 | ≤ 182345 | 221 | ≤ 10208280 |
| 30 | ≤ 62 | 94 | ≤ 3469 | 158 | ≤ 194182 | 222 | ≤ 10870913 |
| 31 | ≤ 66 | 95 | ≤ 3694 | 159 | ≤ 206786 | 223 | ≤ 11576557 |
| 32 | ≤ 71 | 96 | ≤ 3934 | 160 | ≤ 220209 | 224 | ≤ 12328006 |
| 33 | ≤ 75 | 97 | ≤ 4189 | 161 | ≤ 234503 | 225 | ≤ 13128233 |
| 34 | ≤ 80 | 98 | ≤ 4461 | 162 | ≤ 249725 | 226 | ≤ 13980403 |
| 35 | ≤ 85 | 99 | ≤ 4751 | 163 | ≤ 265935 | 227 | ≤ 14887889 |
| 36 | ≤ 91 | 100 | ≤ 5059 | 164 | ≤ 283197 | 228 | ≤ 15854280 |
| 37 | ≤ 97 | 101 | ≤ 5387 | 165 | ≤ 301579 | 229 | ≤ 16883401 |
| 38 | ≤ 103 | 102 | ≤ 5737 | 166 | ≤ 321155 | 230 | ≤ 17979324 |
| 39 | ≤ 110 | 103 | ≤ 6109 | 167 | ≤ 342002 | 231 | ≤ 19146385 |
| 40 | ≤ 117 | 104 | ≤ 6506 | 168 | ≤ 364202 | 232 | ≤ 20389201 |
| 41 | ≤ 124 | 105 | ≤ 6928 | 169 | ≤ 387842 | 233 | ≤ 21712690 |
| 42 | ≤ 132 | 106 | ≤ 7378 | 170 | ≤ 413018 | 234 | ≤ 23122088 |
| 43 | ≤ 141 | 107 | ≤ 7857 | 171 | ≤ 439827 | 235 | ≤ 24622972 |
| 44 | ≤ 150 | 108 | ≤ 8367 | 172 | ≤ 468377 | 236 | ≤ 26221280 |
| 45 | ≤ 160 | 109 | ≤ 8910 | 173 | ≤ 498780 | 237 | ≤ 27923336 |
| 46 | ≤ 170 | 110 | ≤ 9488 | 174 | ≤ 531156 | 238 | ≤ 29735875 |
| 47 | ≤ 181 | 111 | ≤ 10104 | 175 | ≤ 565634 | 239 | ≤ 31666069 |
| 48 | ≤ 193 | 112 | ≤ 10760 | 176 | ≤ 602350 | 240 | ≤ 33721553 |
| 49 | ≤ 205 | 113 | ≤ 11458 | 177 | ≤ 641449 | 241 | ≤ 35910462 |
| 50 | ≤ 218 | 114 | ≤ 12202 | 178 | ≤ 683087 | 242 | ≤ 38241455 |
| 51 | ≤ 233 | 115 | ≤ 12994 | 179 | ≤ 727427 | 243 | ≤ 40723756 |
| 52 | ≤ 248 | 116 | ≤ 13838 | 180 | ≤ 774645 | 244 | ≤ 43367187 |
| 53 | ≤ 264 | 117 | ≤ 14736 | 181 | ≤ 824928 | 245 | ≤ 46182206 |
| 54 | ≤ 281 | 118 | ≤ 15692 | 182 | ≤ 878475 | 246 | ≤ 49179951 |
| 55 | ≤ 299 | 119 | ≤ 16711 | 183 | ≤ 935498 | 247 | ≤ 52372284 |
| 56 | ≤ 318 | 120 | ≤ 17795 | 184 | ≤ 996222 | 248 | ≤ 55771835 |
| 57 | ≤ 339 | 121 | ≤ 18951 | 185 | ≤ 1060888 | 249 | ≤ 59392055 |
| 58 | ≤ 361 | 122 | ≤ 20181 | 186 | ≤ 1129752 | 250 | ≤ 63247269 |
| 59 | ≤ 384 | 123 | ≤ 21491 | 187 | ≤ 1203085 | 251 | ≤ 67352729 |
| 60 | ≤ 409 | 124 | ≤ 22885 | 188 | ≤ 1281179 | 252 | ≤ 71724679 |
| 61 | ≤ 436 | 125 | ≤ 24371 | 189 | ≤ 1364342 | 253 | ≤ 76380419 |
| 62 | ≤ 464 | 126 | ≤ 25953 | 190 | ≤ 1452903 | 254 | ≤ 81338368 |
| 63 | ≤ 494 | 127 | ≤ 27638 | 191 | ≤ 1547213 | 255 | > 81338368 |

*FIG.10*

| LCG ID | Buffer Size(B/S) | | | | | | | Oct 1 |
|---|---|---|---|---|---|---|---|---|
| B/S | R | R | R | R | R | R | R | Oct 2 |

FIG.11

| | | | |
|---|---|---|---|
| Buffer Size(B/S) #0 | | B/S #1 | Oct 1 |
| B/S #1 | | B/S #2 | Oct 2 |
| B/S #2 | B/S #3 | | Oct 3 |
| B/S #4 | | B/S #5 | Oct 4 |
| B/S #5 | | B/S #6 | Oct 5 |
| B/S #6 | B/S #7 | | Oct 6 |

FIG.12

| Length | LCG ID1 | B/S #1 | | Oct 1 |
|---|---|---|---|---|
| B/S #1 | LCG ID2 | | B/S2 | Oct 2 |
| B/S #2 | R | R | R | Oct 3 |

FIG.13

| LCG ID1 | E | B/S #1 | | Oct 1 |
|---------|---|--------|---|-------|
| B/S #1 | LCG ID2 | E | B/S #2 | Oct 2 |
| B/S #2 | | LCG ID3 | E | Oct 3 |
| B/S #3 | | | R | R | Oct 4 |

METHOD AND APPARATUS FOR PROCESSING BUFFER STATUS REPORT FOR NEXT-GENERATION MOBILE COMMUNICATION

CROSS REFERENCE TO RELATED APPLICATION

This application claims priority from Korean Patent Application Nos. 10-2017-0068073 & 10-2018-0001016, filed on May 31, 2017 & Jan. 4, 2018, which are hereby incorporated by reference for all purposes as if fully set forth herein.

BACKGROUND OF THE INVENTION

1. Field of the Invention

The present disclosure relates to transmitting and receiving a buffer status report in a New Radio Access Network (NR). More particularly, the present disclosure relates to a method of a terminal for efficiently transmitting a buffer status report on a plurality of logical channel groups to a base station, and an apparatus thereof.

2. Description of the Prior Art

Recently, the $3^{rd}$ generation partnership project (3GPP) has approved the "Study on New Radio Access Technology", which is a study item for research on next-generation/5G radio access technology. On the basis of such a study item, radio access network working group 1 (RAN WG1) has been discussing frame structures, channel coding and modulation, waveforms, and multiple access methods for New Radio (NR). NR is required not only to provide improved data transmission rate, compared to LTE/LTE-Advanced, but also to be designed to satisfy various requirements in detailed and specific usage scenarios.

Enhanced Mobile BroadBand (eMBB), massive Machine-Type Communication (mMTC), and Ultra Reliable and Low Latency Communication (URLLC) are proposed as typical usage scenarios for NR. In order to meet the requirements of the individual scenarios, it is required to design flexible frame structures, compared to those for LTE/LTE-Advanced.

In NR, it is necessary to provide eMBB and mMTC services that require high-speed high-capacity data processing and a URLLC service that requires high-speed data processing. To this end, there is a need for developing efficient scheduling considering various traffic types.

However, in a related art, only information on a buffer status for four logical channel groups are transmitted in a buffer status report, thereby restricting efficient scheduling. In order to solve this problem, a buffer status report can be transmitted by simply increasing the number of logical channel groups. In this case, the overheads of the entire system is increased, and radio resources are wasted.

Therefore, there is a need for developing a technique for transmitting buffer status information for a plurality of logical channel groups at one time for efficient scheduling, and minimizing overheads.

SUMMARY OF THE INVENTION

In this background, the present disclosure is to provide a method and an apparatus for transmitting a buffer status report on a plurality of logical channel groups as well as for minimizing an increase in radio resource overheads.

To solve the foregoing problem, an embodiment provides a method for transmitting, by a terminal, a Buffer Status Report (BSR), the method including: monitoring whether a regular BSR or a periodic BSR is triggered; determining that a BSR format is a long BSR when there is data available for uplink transmission in one or more Logical Channel Groups (LCGs); and transmitting, to a base station, a BSR for all LCGs having the data available for uplink transmission, which is configured in the long BSR format, when the regular BSR or the periodic BSR is triggered.

An embodiment provides a method for receiving, by a base station, a BSR, the method including: receiving a BSR for all LCGs having data available for uplink transmission, which is configured in a long BSR format, according to a trigger of a regular BSR or a periodic BSR by a terminal; and checking buffer size information for each LCG of the terminal on the basis of the BSR.

An embodiment provides a terminal for transmitting a BSR, the terminal including: a controller configured to monitor whether a regular BSR or a periodic BSR is triggered, and to determine that a BSR format is a long BSR when there is data available for uplink transmission in one or more LCGs; and a transmitter configured to transmit, to a base station, a BSR for all LCGs having the data available for uplink transmission, which is configured in the long BSR format, when the regular BSR or the periodic BSR is triggered.

An embodiment provides a base station for receiving a BSR, the base station including: a receiver configured to receive a BSR for all LCGs having data available for uplink transmission, which is configured in a long BSR format, according to a trigger of a regular BSR or a periodic BSR by a terminal; and a controller configured to check buffer size information for each LCG of the terminal on the basis of the BSR.

According to the present embodiments, a BSR about a plurality of LCGs is transmitted while minimizing radio resource overheads, thereby enabling a base station to efficiently allocate uplink resources.

BRIEF DESCRIPTION OF THE DRAWINGS

The above and other aspects, features and advantages of the present disclosure will be more apparent from the following detailed description taken in conjunction with the accompanying drawings, in which:

FIG. 8 illustrates a long BSR format according to still another embodiment;

FIG. 9 illustrates a table for generating index information included in a buffer size field according to an embodiment;

FIG. 10 illustrates a short BSR format set to a designated size according to an embodiment;

FIG. 11 illustrates a long BSR format set to a designated size according to an embodiment;

FIG. 12 illustrates a BSR format that specifies a number of Logical Channel Groups (LCGs) through a BSR according to an embodiment;

FIG. 13 illustrates a BSR format using an extension field according to an embodiment;

DETAILED DESCRIPTION OF THE EXEMPLARY EMBODIMENTS

Figure 1:
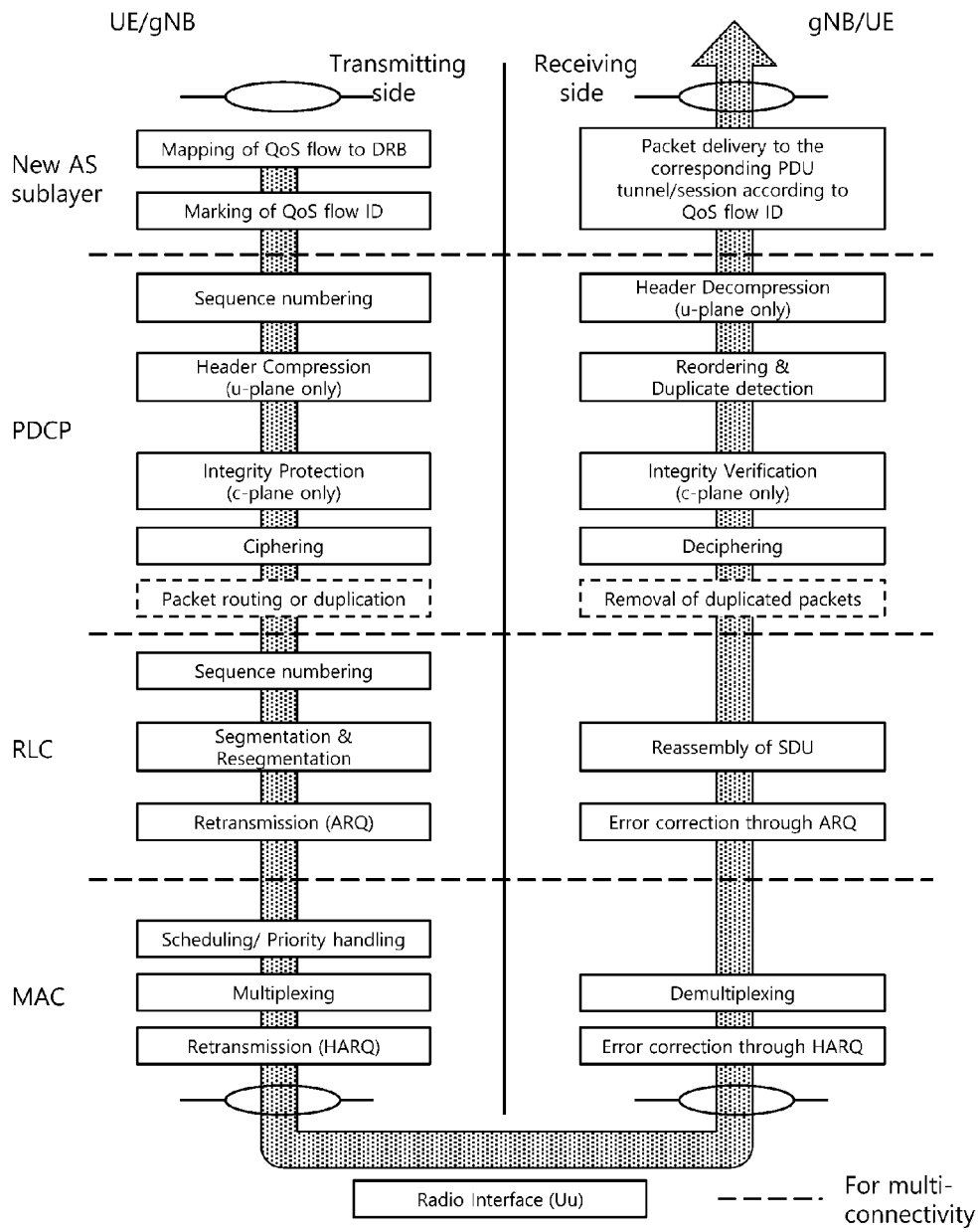
FIG. 1 illustrates a Layer 2 structure for a new Radio Access Technology (RAT)

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

As used herein, a wireless communication system may be a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), long term evolution (LTE), high speed packet access (HSPA), international mobile telecommunication (IMT)-2020 (5G or New Radio), and the like, and a MS (Mobile station), a UT (User Terminal), an SS (Subscriber Station), a wireless device, and the like inglobal systems for mobile communication (GSM).

A base station or a cell may generally refer to a station performing communication with a User Equipment (UE). Such a base station (e.g., cell) means, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or tranceiving point), a Relay Node, a Mega Cell, a Macro Cell, a Micro Cell, a Pico Cell, a Femto Cell, a Remote Radio Head (RRH), a Radio Unit (RU), and a Small Cell.

Each of the above mentioned various cells has a base station that controls a corresponding cell, and thus, the base station may be construed in two ways. 1) the base station may be a device itself that provides a megacell, a macrocell, a microcell, a picocell, a femtocell, and a small cell in association with a wireless area, or 2) the base station may indicate a wireless area itself. In 1), the base station may be all devices that interact with one another to enable the devices that provide a predetermined wireless area to be controlled by an identical entity or to cooperatively configure the wireless area. Based on a configuration type of a wireless area, a point, a transmission/reception point, a transmission point, a reception point, or the like may be an embodiment of a base station. In 2), the base station may be a wireless area itself that receives or transmits a signal from a perspective of a terminal or a neighboring base station.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

In the specification, the user equipment and the base station are used as two (uplink or downlink) inclusive transceiving subjects to embody the technology and technical concepts described in the specifications, and may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using i) a TDD (Time Division Duplex) scheme that performs transmission based on different times, ii) an FDD (Frequency Division Duplex) scheme that performs transmission based on different frequencies, or iii) a mixed scheme of the TDD and FDD schemes.

Further, in a wireless communication system, a standard may be developed by configuring an uplink and a downlink based on a single carrier or a pair of carriers.

The uplink and the downlink may transmit control information through a control channel, such as a PDCCH (Physical Downlink Control CHannel), PUCCH (Physical Uplink Control CHannel), and the like, and the uplink and the downlink may be configured as a data channel, such as PDSCH (Physical Downlink Shared CHannel), PUSCH (Physical Uplink Shared CHannel), and the like, so as to transmit data.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, a situation, in which signals are transmitted and received through a channel such as a PUCCH, a PUSCH, a PDCCH, or a PDSCH, will be expressed as the transmission and reception of a PUCCH, a PUSCH, a PDCCH, or a PDSCH.

Meanwhile, higher layer signaling includes an radio resource control (RRC) signaling that transmits RRC information including an RRC parameter.

A base station performs downlink transmission to terminals. A base station may transmit a physical downlink control channel for transmitting downlink control information such as scheduling required to receive a downlink data channel that is a main physical channel for unicast transmission, and scheduling approval information for transmission on an uplink data channel. Hereinafter, transmission and reception of a signal through each channel will be described as transmission and reception of a corresponding channel.

Varied multiple access schemes may be unrestrictedly applied to the wireless communication system. Various multiple access schemes, such as TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like may be used. Here, NOMA includes SCMA (Sparse Code Multiple Access), LDS (Low Cost Spreading), and the like.

An embodiment of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present specifications, a machine type communication (MTC) terminal refers to a terminal that is low cost (or is not very complexity), a terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost(or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost(or low complexity) UE category/type. Alternatively, the MTC terminal may refer to a further Enhanced MTC terminal defined in Release-14.

In the present specification, a NarrowBand Internet of Things (NB-IoT) terminal refers to a terminal supporting radio access for cellular IoT. NB-IoT technology are aimed at improved indoor coverage, support for large-scale low-speed terminals, low latency sensitivity, very low terminal costs, low power consumption, and optimized network architecture.

Enhanced Mobile BroadBand (eMBB), massive Machine-Type Communication (mMTC), and Ultra Reliable and Low Latency Communication (URLLC) are proposed as typical usage scenarios for New Radio (NR) which has been under discussion in the 3GPP in recent years.

In the present specification, a frequency, a frame, a subframe, a resource, a resource block, a region, a band, a subband, a control channel, a data channel, a synchronization signal, various reference signals, various signals, and various messages associated with NR may be interpreted as meanings used in the past or present used or as various meanings to be used in the future.

For example, in the present specification, LTE and NR refer to different radio access technologies, and a new radio access technology under discussion in 3GPP Release 15 is referred to as NR. NR may have various differences from LTE in frame structure, channel, and core network technology, and NR may further include various functions for wireless transmission and high-speed high-capacity data transmission in a high band.

In the following description, for convenience and ease of understanding, the typical radio access technology is referred to as LTE and the new radio access technology under discussion in 3GPP is referred to as NR. In addition, a base station may be an eNB using LTE technology or a gNB using NR technology, and these terms are used in a separate manner as necessary.

In the present specification, a cell is a term used to comprehensively refer to a radio channel, a radio link, and a carrier for transmitting data, and one base station can transmit and receive data through a plurality of cells. Alternatively, a terminal can transmit and receive data via a plurality of cells controlled separately by two base stations. In the following description, a case where one base station controls a plurality of cells is defined as carrier aggregation, and a case where a plurality of cells controlled by two or more base stations is used is defined as dual connectivity.

New Radio (NR)

In 3GPP, research is underway on next-generation/5G radio access technology (hereinafter, referred to as NR for convenience of explanation). NR provides a new AS sublayer on top of the PDCP layer in order to provide flow-based QoS.

FIG. 1 illustrates a Layer 2 structure for a new Radio Access Technology (RAT).

As illustrated in FIG. 1, the main services and functions of the new AS sublayer are as follows.

Mapping between QoS flow and data radio bearer.

Marking QoS flow ID in both DL and UL packets.

Further, a new user plane protocol layer is applicable for connection to a next-generation core. A single protocol entity of the new user plane protocol layer may be configured for each individual PDU session Buffer Status Reporting Procedure A buffer status reporting procedure is a procedure for providing a serving base station with information about data available for transmission in uplink (UL) buffers associated with a MAC entity. An RRC entity configures three timers (e.g., periodicBSR-Timer, retxBSR-Timer, and logicalChannelSR-ProhibitTimer) and controls the transmission of a Buffer Status Report (BSR) through signaling of allocating a logical channel to a logical channel group for each logical channel.

A buffer status reporting (BSR) needs to be triggered when the following events occur.

UL data, for a logical channel which belongs to a Logical Channel Group (LCG), becomes available for transmission in an Radio Link Control (RLC) entity or a Packet Data Convergence Protocol (PDCP) entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred to as a "regular BSR".

When an UL resource is allocated and the number of padding bits is equal to or greater than the size of a BSR MAC control element plus a subheader thereof, the BSR is referred to as a "padding BSR".

When a retransmission BSR timer (retxBSR-Timer) expires and a terminal has data available for transmission for any of the logical channels belonging to an LCG, the BSR is also referred to as a "regular BSR".

When a periodic BSR timer (periodicBSR-Timer) expires, the BSR is referred to as a "periodic BSR".

In addition to the foregoing BSRs classified by triggering type, BSRs may also be classified into a short BSR, a truncated BSR, and a long BSR according to format.

Figure 2:
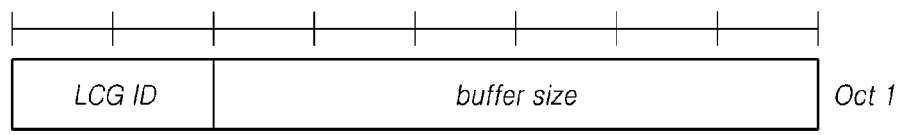
FIG. 2 illustrates a short Buffer Status Report (BSR) format according to the related art.
Figure 3:
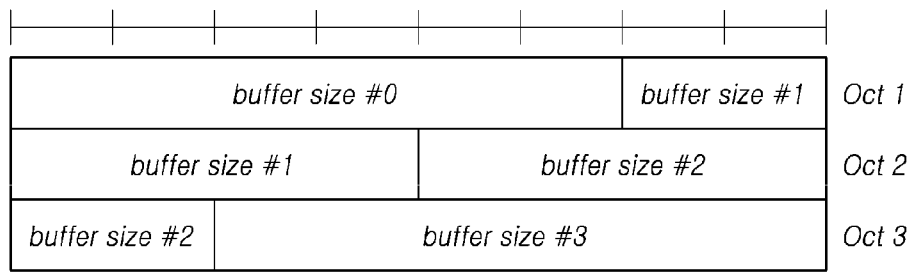
FIG. 3 illustrates a long BSR format according to the related art.

FIG. 2 illustrates a short BSR format according to the related art, and FIG. 3 illustrates a long BSR format according to the related art.

For a regular BSR and a periodic BSR, when more than one LCG has data available for transmission in a Transmission Time Interval (TTI) where a BSR is transmitted, a long BSR is transmitted. Otherwise, a short BSR is transmitted.

For a padding BSR, when the number of padding bits is equal to or greater than the size of a short BSR plus a subheader thereof but is smaller than the size of a long BSR plus a subheader thereof, and when more than one LCG has data available for transmission in a TTI where a BSR is transmitted, a truncated BSR of an LCG having the highest-priority logical channel with data available for transmission is transmitted. Otherwise, a short BSR is transmitted.

Otherwise, when the number of padding bits is equal to or greater than the size of the long BSR plus the subheader thereof, a long BSR is transmitted.

As illustrated in FIG. 2, the short BSR and the truncated BSR include LCG group ID information and buffer size information. As illustrated in FIG. 3, the long BSR sequentially includes pieces of buffer size information on four LCGs.

A BSR is transmitted to a MAC Control Element (MAC CE), and one MAC Protocol Data Unit (PDU) may include at most one MAC BSR control element.

When one BSR is included in one MAC PDU for transmission, all triggered BSRs are canceled.

The MAC entity needs to transmit at most one regular/periodic BSR within one TTI.

All BSRs transmitted within one TTI always indicate a buffer status after all MAC PDUs are created for this TTI. Each LCG needs to transmit at most one buffer status value per TTI. This value needs to be transmitted within all BSRs transmitting a buffer status for this LCG.

Data Available for Transmission or Data Volume

For a BSR in a MAC layer, a terminal needs to consider the following as the amount of data available in an RLC layer.

RLC SDUs or segments not yet included in an RLC data PDU
  RLC data PDUs pending for retransmission (RLC AM)
  RLC data PDUs pending for initial transmission For the BSR in the MAC layer, the terminal needs to consider PDCP control PDUs and the following as the amount of data available in a PDCP layer.

For SDUs whose PDUs are not submitted to a lower layer,
    When there is an SDU that has not yet been processed by the PDCP layer, the SDU itself
    When there is an SDU processed by the PDCP layer, the PDU
  For SDUs whose PDUs are just submitted to a lower layer before PDCP reconfiguration, starting from the first SDU for transmitting corresponding PDUs not acknowledged by the lower layer, excluding SDUs indicated as being successfully transmitted by a PDCP status report
    When there is an SDU that has not yet been processed by the PDCP layer, the SDU itself
    When there is an SDU processed by the PDCP layer, the PDU As described above, two types of BSR formats (short BSR and long BSR) are supported in the typical LTE technology. For a long BSR, only four LCGs may be included. In addition to an eMBB service, NR may provide a massive MTC service or a URLLC service, in which efficient scheduling in view of various traffic types may be considered. To support efficient scheduling, it is necessary to increase the number of LCGs, which is currently limited to four. In this case, however, overheads for transmitting a BSR for the increased number of LCGs may be increased.

To solve the foregoing problem, the present disclosure is devised to provide a method and an apparatus for efficiently transmitting a BSR when the number of LCGs, which is currently limited to four, is increased.

The present disclosure may be applied not only to a next-generation mobile communication (5G mobile communication/NR) terminal but also to any radio access (e.g., LTE) network/terminal. For convenience of explanation, hereinafter, a base station may refer to an eNodeB or an LTE base station of LTE/E-UTRAN, to an NR node, a gNB, a gNB-CU or a gNB-DU in a 5G radio network in which a Central Unit (CU) and a Distribute Unit (DU) are separated, or to a gNodeB or an NR base station in which a CU and a DU are configured as a single logical entity. For convenience of explanation, the term "base station" is used hereinafter, but all the entities mentioned above may be included in the category of this term.

Hereinafter, various BSR formats for transmitting a BSR for more than four LCGs using one BSR in order to efficiently transmit buffer status information will be described with reference to embodiments. For convenience of explanation, it is illustrated that there are eight LCGs, but the number of LCGs is not limited thereto. In the following embodiments, a BSR format in which a buffer size is divided by the LCG is illustrated, but a BSR format in which a buffer size is divided by the logical channel is also included in the scope of the present disclosure.

Further, although a terminal is illustrated as an agent transmitting a BSR in the present specification, at least one of monitoring a trigger of the BSR, determining a BSR format, and transmitting the BSR format may be performed by a MAC entity of the terminal. Accordingly, a terminal needs to be interpreted as including a MAC entity of the terminal and may be interpreted as a MAC entity, a MAC layer, or the like.

The following embodiments may be applied individually or in combination with each other.

First Embodiment: Method for Indicating a BSR by Defining a Field Indicating Whether Each LCG is Included FIG. 4 is a flowchart showing operations of a terminal according to an embodiment.

Figure 4:
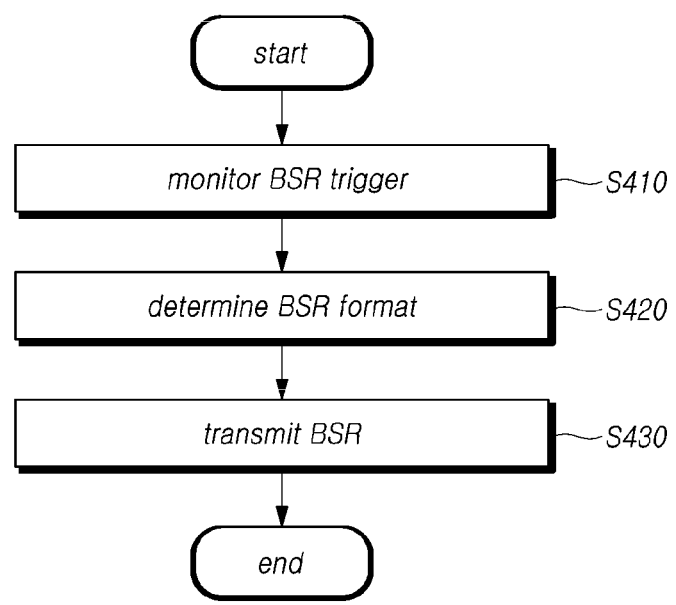
FIG. 4 is a flowchart showing operations of a terminal according to an embodiment.

Referring to FIG. 4, the terminal (or a MAC entity of the terminal: the term "terminal is used for convenience of explanation, which may mean a MAC entity of a terminal that processes a BSR operation) may perform an operation of monitoring a trigger of a regular BSR or a periodic BSR (S410). For example, the terminal may monitor whether a BSR is triggered. As described above, the terminal may configure three timers (e.g., periodic BSR-Timer, retxBSR-Timer, and logicalChannelSR-ProhibitTimer) and may monitor whether a BSR is triggered using a periodic BSR timer and a retransmission BSR timer. Further, the terminal may monitor whether a BSR event illustrated above occurs, thereby checking whether a BSR is triggered and whether a BSR to be transmitted is a regular BSR or a periodic BSR. In addition, the terminal may monitor whether there is a padding BSR if necessary.

When there is data available for UL transmission in one or more LCGs, the terminal may perform an operation of determining that a BSR format is a long BSR (S420). The terminal may determine a BSR format for a BSR. For example, when there is data available for UL transmission in one or more LCGs in one TTI, the terminal may determine a BSR format to be a long BSR in order to transmit the data. The TTI may refer to any physical-layer transmission time unit defined in NR. For example, the TTI may be one subframe, one slot, one mini-slot, n mini-slots, n slots, or n symbols (where n is a natural number) and may be configured for the terminal by a base station via an RRC message. In another example, when there is data available for UL transmission in one or more LCGs when transmitting a BSR, the terminal may determine a BSR format to be a long BSR in order to transmit the data. In still another example, when there is data available for UL transmission in one or more LCGs when triggering a BSR, the terminal may determine a BSR format to be a long BSR in order to transmit the data.

Next, when a regular BSR or a periodic BSR is triggered, the terminal may perform an operation of transmitting, to the base station, a BSR for all LCGs having the data available for UL transmission configured in the long BSR format (S430). When there is data available for UL transmission in one or more LCGs when transmitting a BSR, the terminal transmits, to the base station, a BSR for all LCGs having data available for the regular BSR or the periodic BSR.

For example, the terminal may transmit a BSR in the long BSR format to the base station via the regular BSR or the periodic BSR, thereby reporting buffer status information on the terminal to the base station.

For example, the BSR configured in the long BSR format may include an LCG indication field and a buffer size field. In this case, the LCG indication field includes information indicating whether a buffer size field for each LCG is present in the BSR. Further, the LCG indication field may be configured in an 8-bit bitmap and indicate whether the buffer size field for each LCG is present.

In addition, the LCG indication field may indicate whether the buffer size field for each LCG of eight LCGs is present, and the buffer size field may include buffer size information only for an LCG having available data according to in ascending priority order.

The buffer size field may include eight bits for each LCG and may include index information set according to buffer size information for each LCG. The index information may be mapped according to the range of buffer size information and may be determined according to the preset table.

In configuring a long BSR format to transmit a BSR including buffer status information for all LCGs that have available data, the terminal may configure the long BSR format including an LCG indication field and a buffer size field having buffer status information in order to minimize overheads.

Figure 5:
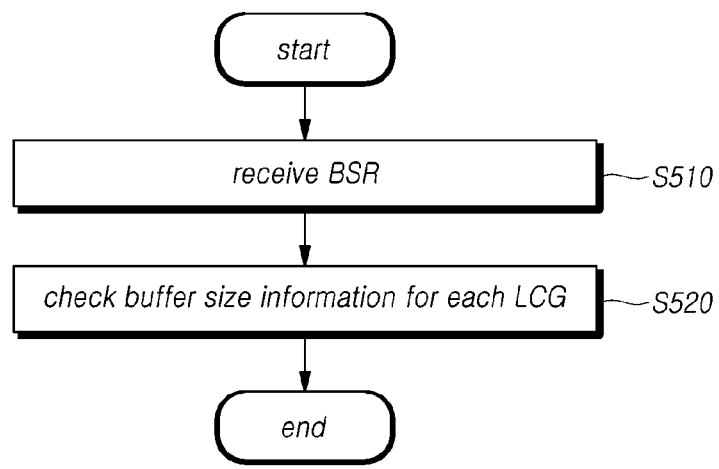
FIG. 5 is a flowchart showing operations of a base station according to an embodiment.

FIG. 5 is a flowchart showing operations of a base station according to an embodiment.

Referring to FIG. 5, the base station may perform an operation of receiving a BSR for all LCGs having data available for UL transmission, which is configured in a long BSR format, according to the trigger of regular BSR or a periodic BSR by a terminal (S510).

For example, the BSR configured in the long BSR format may include a LCG indication field and a buffer size field. In this case, the LCG indication field includes information indicating whether a buffer size field for each LCG is present in the BSR. Further, the LCG indication field may be configured in an 8-bit bitmap and indicate whether the buffer size field for each LCG is present.

In addition, the LCG indication field may indicate whether the buffer size field for each LCG of eight LCGs is present, and the buffer size field may include buffer size information only for a LCG having available data according to in ascending priority order.

The buffer size field may include eight bits for each LCG and may include index information set according to buffer size information for each LCG. The index information may be mapped according to the range of buffer size information and may be determined according to the preset table.

As such, the base station may receive, from the terminal, the BSR in the long BSR format including the LCG indication field and the buffer size field having buffer status information.

The base station may perform an operation of checking buffer size information for each LCG of the terminal on the basis of the BSR (S520). For example, the base station may check information in the LCG indication field included in the BSR and may check information on an LCG including the buffer status information. In addition, the base station may obtain information on a buffer size for each LCG through information in the buffer size field.

The base station may configure a UL radio resource for the terminal using the obtained buffer status information and may transmit the UL radio resource to the terminal.

Hereinafter, a long BSR format according to the foregoing operations of the terminal and the base station will be described in detail with reference to the accompanying drawings.

As described above, a terminal may determine the format of a BSR to be a long BSR format. In this case, the long BSR format may include a LCG indication field and a buffer size field.

For example, when one LCG has available data for transmission in a TTI in which a BSR is transmitted, the terminal may transmit a BSR including an LCG indication field indicating whether each LCG is included.

In another example, when one or more LCGs have available data for transmission in a TTI in which a BSR is transmitted, the terminal may transmit a BSR including an LCG indication field indicating whether each LCG is included.

Figure 6:
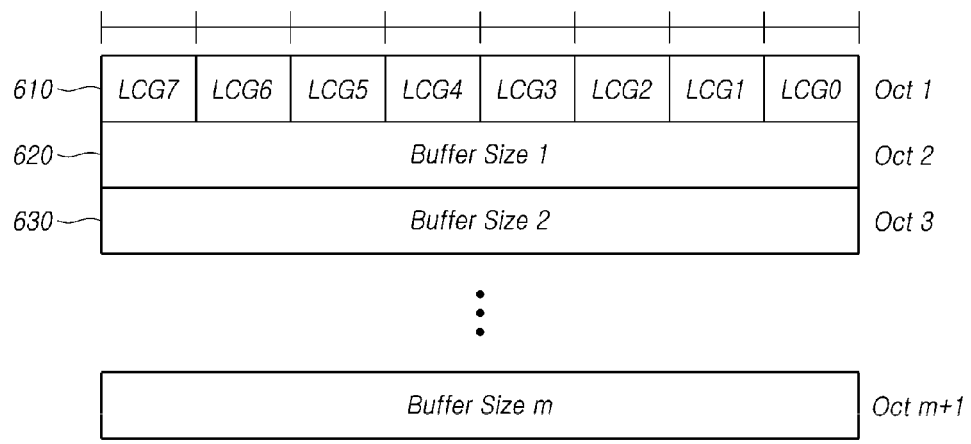
FIG. 6 illustrates a long BSR format according to an embodiment.

FIG. 6 illustrates a long BSR format according to an embodiment.

Referring to FIG. 6, the long BSR format may include an LCG indication field 610 and buffer size fields 620 and 630. As described above, the LCG indication field 610 may indicate whether buffer size information for a corresponding LCG is included in a corresponding BSR.

For example, each of the LCG indication field 610 and the buffer size fields 620 and 630 may include eight bits, and the LCG indication field 610 may indicate, using one bit, the presence of available UL data for each LCG and the absence of available UL data for each LCG, which are set to 1 and 0 (or 0 and 1), respectively. For example, 1 indicates that buffer size information for a corresponding LCG is reported, and 0 indicates that buffer size information for a corresponding LCG is not reported. That is, when the LCG indication field 610 has a value set to "01010100", the LCG indication field 610 indicates that buffer size information for LCGs 2, 4, and 6 is included in a corresponding BSR.

Accordingly, it is possible to report to the base station through eight bits whether there are available UL data for each of eight LCGs.

The buffer size field includes eight bits and may include buffer size information for up to eight LCGs.

Figure 7:
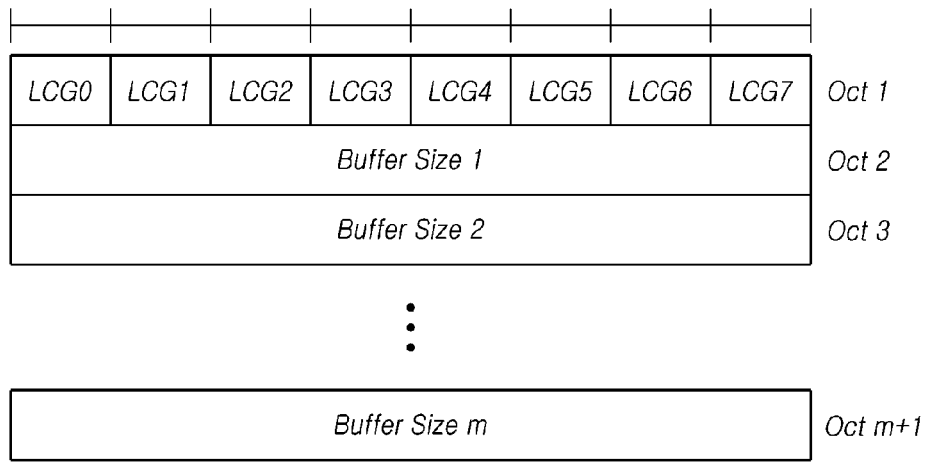
FIG. 7 illustrates a long BSR format according to another embodiment.

FIG. 7 illustrates a long BSR format according to another embodiment.

Referring to FIG. 7, unlike in FIG. 6, LCG indexes of an LCG indication field may be set to be included in ascending order. Therefore, when the LCG indication field has a value set to "01010100", the LCG indication field indicates that buffer size information for LCGs 1, 3, and 5 is included in a corresponding BSR, unlike in FIG. 6.

FIG. 8 illustrates a long BSR format according to still another embodiment.

Referring to FIG. 8, the foregoing long BSR may include an LCG indication field indicating whether each LCG is included and a buffer size (B/S) field. The buffer size field may include eight bits and may include buffer size information only for an LCG indicated by the LCG indication field.

For example, the buffer size field may include only a buffer size for available UL data of an LCG having the available UL data. For example, as illustrated in FIG. 6, when the eight bits of the LCG indication field are "01010100" (when the second, fourth, and sixth LCGs have available UL data), the buffer size field may include only a buffer size for each of the second, fourth, and sixth LCGs. In this case, the buffer size fields may be included in ascending priority order. For example, as illustrated in FIG. 8, pieces of buffer size information on the second, fourth, and sixth LCGs may be sequentially included. Alternatively, the buffer size fields may be included in the same order as the order of LCG indication fields. For example, the pieces of buffer size information on the sixth, fourth, and second LCGs may be sequentially included.

In another example, the buffer size field may include a buffer size for available UL data of all LCGs.

In still another example, the buffer size field may include a buffer size for data included in an LCG according to the priority.

A value included in the buffer size field may be index information corresponding to buffer size information for each LCG. FIG. 9 illustrates a table for generating index information included in a buffer size field according to an embodiment.

Referring to FIG. 9, a buffer size field may include buffer size information for each LCG that is converted into index information using a preset table. For example, when the buffer size value of a particular LCG is 120, a terminal may transmit an index value of 41 corresponding to the buffer size value (BS value) via a corresponding buffer size field. Accordingly, the terminal may transmit buffer size information of various sizes using an 8-bit buffer size field.

The preset table may be preconfigured by the terminal and a base station, and the range of buffer size information may be identified through index information. Accordingly, the base station may allocate, for the terminal, a UL radio resource that matches corresponding buffer size information.

The table illustrated above is an example, and table values may be changed according to the configuration.

As described above, the terminal transmits buffer size information for eight LCGs to the base station using one long BSR format. In this manner, it is possible to transmit buffer size information for a plurality of LCGs, minimizing radio resource overheads, thereby enabling swift and efficient radio resource scheduling.

Second Embodiment: Method of Using an Additional BSR Format with a Designated Size in Addition to a Short BSR and a Long BSR FIG. 10 illustrates a short BSR format set to a designated size according to an embodiment, and FIG. 11 illustrates a long BSR format set to a designated size according to an embodiment.

Figure 10:
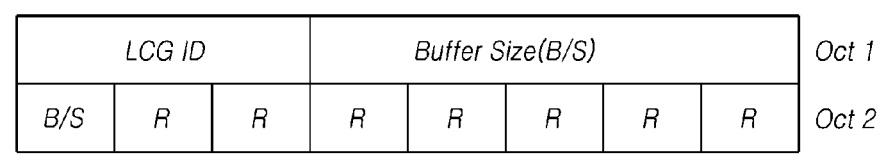

In one example, when one LCG has data available for transmission in a TTI in which a BSR is transmitted, a terminal may transmit a short BSR illustrated in FIG. 10.

In another example, when one or more LCGs have data available for transmission in a TTI in which a BSR is transmitted, the terminal may transmit a long BSR illustrated in FIG. 11.

In still another example, when one or more LCGs have data available for transmission in a TTI in which a BSR is transmitted, the terminal may report the long BSR illustrated in FIG. 11.

In yet another example, when one or more LCGs have data available for transmission in a TTI in which a BSR is transmitted, the terminal may transmit a BSR with a specified size. The BSR may include one or more fields of an LCG ID field and a buffer size field. The specified size may indicate the number of LCGs having available UL data included in the BSR, which may be indicated to the terminal by a base station. For example, the specified size may be indicated to the terminal via RRC signaling. Alternatively, the specified size may be indicated to the terminal via a MAC CE, in which a Logical Channel ID (LCID) for the MAC CE may be specified.

In still another example, a BSR with a designated size may be defined and used as a truncated BSR. Alternatively, a BSR with a designated size may be used as a new BSR, which is different from the truncated BSR.

Here, the buffer size field indicates the total amount of data available across one LCG after all MAC PDUs are created in a corresponding TTI. The amount of data is indicated by the number of bytes. This may include all data available for transmission in an RLC layer and a PDCP layer (or in the RLC layer, the PDCP layer, and a new AS sublayer). For example, RLC and MAC headers are not considered for buffer size calculation. In another example, the MAC header is not considered in buffer size calculation, whereas the RLC header may be considered (included) in buffer size calculation. That is, as a concatenation function is removed from the RLC layer, the RLC header may be created by preprocessing, so that it may be preferable to include the RLC header in the calculation for accurate buffer size calculation. The foregoing definition of the buffer size field may also be applied to other embodiments. In another example, the MAC header and the RLC header may be considered (included) in buffer size calculation, which is possible when considering LTE and new different header processing.

Third Embodiment: Method of Indicating the Number of LCGs Having Data Available for Transmission Through a BSR FIG. 12 illustrates a BSR format that specifies the number of LCGs through a BSR according to an embodiment.

In one example, when one LCG has data available for transmission in a TTI in which a BSR is transmitted, a terminal may transmit a BSR including the number of corresponding LCGs.

In another example, when one or more LCGs have data available for transmission in a TTI in which a BSR is transmitted, the terminal may transmit a BSR including the number of corresponding LCGs.

The BSR may have the number of LCGs having data available for transmission (indicated by Length in FIG. 12, which is for convenience of explanation and may be replaced by another term), an LCG ID field, and a buffer size field. The specified size represents the number of LCGs included in the BSR.

When there are eight LCGs (in total) having data available for transmission, a BSR may be created to include only a buffer size field, with an LCG ID field omitted.

Fourth Embodiment: Method of Indicating a Total Buffer Size for an LCG Having Data Available for Transmission For example, when one or more LCGs have data available for transmission in a TTI in which a BSR is transmitted, a terminal may transmit a BSR including a total buffer size for the LCGs having data available for transmission.

That is, the terminal may transmit, to a base station, the BSR including information on all available data as one piece of buffer size information, instead of separately transmitting buffer size information for each LCG.

Fifth Embodiment: Method of Indicating a Buffer Size for the Sum of Data Available for Transmission of the Remaining LCGs For example, when one or more LCGs have data available for transmission in a TTI in which a BSR is transmitted, a terminal may indicate, via a BSR, an LCG ID for an LCG having the highest priority, a buffer size for the LCG ID, and a buffer size for the sum of data available for LCG IDs having data available for the remaining transmission.

In another example, when one or more LCGs have data available for transmission in a TTI in which a BSR is transmitted, the terminal may indicate, via a BSR, LCG IDs for a specified number of LCGs, a buffer size for the LCG ID, and a buffer size for the sum of data available for LCG IDs having data available for the remaining transmission. In this case, the LCG IDs for the specified number of LCGs may be included according to the priority. The specified number may be preconfigured in the terminal or may be indicated by a base station. For example, the specified number may be conveyed to the terminal via RRC signaling. In another example, the specified number may be conveyed to the terminal via a MAC CE, in which an LCID for the MAC CE may be designated. In still another example, the specified number may be transmitted via the BSR.

Sixth Embodiment: Method of Indicating the Presence of an Additional Logical Channel Via a BSR Having an Extension Field Defined In one example, when one LCG has data available for transmission in a TTI in which a BSR is transmitted, a terminal may transmit a BSR having an extension field defined.

In another example, when one or more LCGs have data available for transmission in a TTI in which a BSR is transmitted, the terminal may transmit a BSR having an extension field defined.

The BSR may have an LCG-specific buffer size for an LCG having data available data for transmission according to the priority. The BSR may include one or more pieces of information among an LCG ID field, a buffer size field, and an extension field.

The extension field refers to a flag (set to 1 and 0 (or 0 and 1) for indication) field to indicate whether there is an additional LCG having available data (if more LCG(s) is/are present) after a corresponding LCG.

For convenience of description, this field is denoted by an extension field E in FIG. 13. This term is merely used for convenience of explanation and may be replaced with any other name.

FIG. 13 illustrates a BSR format using an extension field according to an embodiment.

Referring to FIG. 13, when an LCG ID having the highest priority is LCG ID 1, LCG ID 1 is included first. When there is data available for LCG ID 1 and LCG ID 2 and the presence of an additional LCG having available data is indicated by 1 in an extension field, the first E is set to 1, the second E is set to 1, and the third E is set to 0.

Seventh Embodiment: Method of Indicating a Plurality of LCGs Via a Truncated BSR For a padding BSR, when the number of padding bits is equal to or greater than the size of a short BSR plus a subheader thereof but is smaller than the size of a long BSR plus a subheader thereof, and when more than one LCG has data available for transmission in a TTI where a BSR is transmitted, a truncated BSR of an LCG having a highest-priority logical channel having data available for transmission is transmitted. In the typical LTE technology, a padding BSR or truncated BSR carries only a buffer size for one logical channel with the highest priority. In NR, a buffer size for one or more LCGs may be transmitted via a padding BSR or truncated BSR. For example, the foregoing methods may be used individually or in combination. In another example, a buffer size may be transmitted for as many LCGs according to the priority as possible within the number of padding bits.

Eighth Embodiment: Method of Using an Integrated BSR Format

In one example, a buffer status may be transmitted using one integrated BSR format according to one of the foregoing methods.

In another example, a buffer status may be transmitted using a BSR triggered according to an existing trigger criterion or a particularly defined trigger criterion or using an integrated BSR format for a triggered LCG.

As described above, according to the present disclosure, a terminal may transmit buffer status information for a greater number of LCGs than typically transmitted LCGs to a base station while minimizing radio resource overheads.

The configuration of a terminal and a base station capable of performing some or all of the operations of the foregoing embodiments will be described again with reference to drawings.

Figure 14:
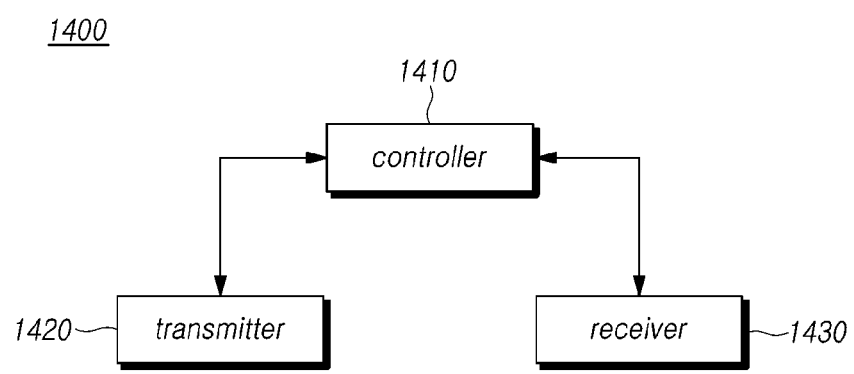
FIG. 14 illustrates a terminal according to an embodiment.

FIG. 14 illustrates a terminal according to an embodiment.

Referring to FIG. 14, the terminal 1400 may include: a controller 1410 configured to monitor whether a regular BSR or a periodic BSR is triggered, and to determine that a BSR format is a long BSR when there is data available for UL transmission in one or more LCGs; and a transmitter 1420 to transmit, to a base station, a BSR for all LCGs having data available for UL transmission, which is configured in the long BSR format, when a regular BSR or a periodic BSR is triggered.

The controller 1410 may monitor whether a BSR is triggered. Further, the controller 1410 may configure three timers (e.g., periodicBSR-Timer, retxBSR-Timer, and logicalChannelSR-ProhibitTimer) and may monitor whether a BSR is triggered using a periodic BSR timer and a retransmission BSR timer. In addition, the controller 1410 may monitor whether a BSR event illustrated above occurs, thereby checking whether a BSR is triggered and whether a BSR to be transmitted is a regular BSR or a periodic BSR.

Also, the controller 1410 may monitor whether there is a padding BSR or not if necessary.

The controller 1410 may decide a BSR format for a BSR of the terminal. For example, when there is data available for UL transmission in one or more LCGs in one TTI, the controller 1410 may determine a BSR format to be a long BSR in order to transmit the data.

For example, the BSR configured in the long BSR format may include an LCG indication field and a buffer size field. In this case, the LCG indication field includes information indicating whether a buffer size field for each LCG is present in the BSR. Further, the LCG indication field may be configured in an 8-bit bitmap and may indicate whether the buffer size field for each LCG is present.

In addition, the LCG indication field may indicate whether the buffer size field for each LCG of eight LCGs is present, and the buffer size field may include buffer size information only for an LCG having available data according to in ascending priority order.

The buffer size field may include eight bits for each LCG and may include index information set according to buffer size information for each LCG. The index information may be mapped according to the range of buffer size information and may be determined according to the preset table.

The transmitter 1420 may transmit the BSR in the long BSR format to a base station using a regular BSR or a periodic BSR, thereby reporting buffer status information on the terminal to the base station.

In addition, the controller 1410 may control the overall operations of the terminal 1400 to determine a BSR format necessary to perform the foregoing embodiments and to transmit the BSR format to the base station.

The transmitter 1420 and a receiver 1430 are used to transmit and receive signals, messages, or data necessary to perform the foregoing embodiments to and from the base station.

Figure 15:
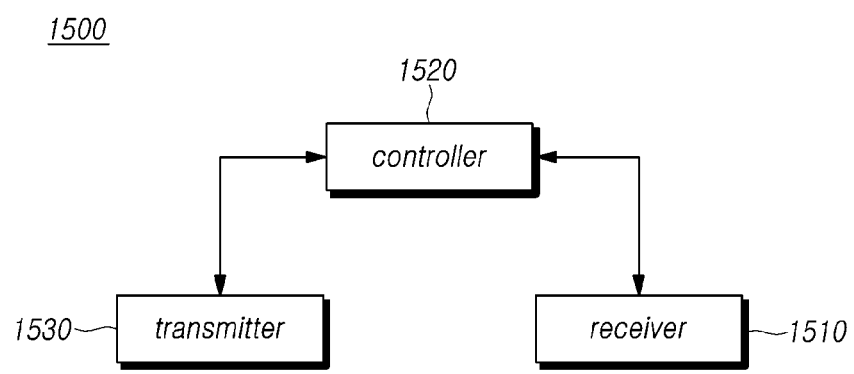
FIG. 15 illustrates a base station according to an embodiment.

FIG. 15 illustrates a base station according to an embodiment.

Referring to FIG. 15, the base station 1500 may include: a receiver 1510 configured to receive a BSR for all LCGs having data available for UL transmission, which is configured in a long BSR format, according to the trigger of a regular BSR or a periodic BSR by a terminal; and a controller 1520 configured to check buffer size information for each LCG of the terminal on the basis of the BSR.

As described above, the BSR configured in the long BSR format may include an LCG indication field and a buffer size field. In this case, the LCG indication field includes information indicating whether a buffer size field for each LCG is present in the BSR. Further, the LCG indication field may be configured in an 8-bit bitmap and may indicate whether the buffer size field for each LCG is present.

In addition, the LCG indication field may indicate whether the buffer size field for each LCG of eight LCGs is present, and the buffer size field may include buffer size information only for an LCG having available data according to in ascending priority order.

The buffer size field may include eight bits for each LCG and may include index information set according to buffer size information for each LCG. The index information may be mapped according to the range of buffer size information and may be determined according to the preset table.

As such, the receiver 1510 may receive, from the terminal, the BSR in the long BSR format including the LCG indication field and the buffer size field having buffer status information.

The controller 1520 may check information in the LCG indication field included in the BSR and may check information on an LCG including the buffer status information. In addition, the controller 1520 may obtain information on a buffer size for each LCG through information in the buffer size field.

A transmitter 1530 may transmit a UL radio resource for the terminal that is allocated using the obtained buffer status information.

In addition, the receiver 1510 receives UL control information and data and messages from the terminal through a corresponding channel.

Further, the controller 1520 controls the overall operations of the base station 1500 to set a BSR format for a BSR in the next-generation mobile communication network (NR), necessary to perform the foregoing embodiments, and to configure the terminal for setting the BSR format.

The transmitter 1530 transmits DL control information and data and messages to the terminal through a corresponding channel.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for transmitting, by a terminal, a Buffer Status Report (BSR), the method comprising:
monitoring whether a regular BSR or a periodic BSR is triggered;
determining that a BSR format is a long BSR when there is data available for uplink transmission in more than one Logical Channel Groups (LCGs); and
transmitting, to a base station, a BSR for all LCGs having the data available for uplink transmission, which is configured in the long BSR format, when the regular BSR or the periodic BSR is triggered, wherein the BSR configured in the long BSR format comprises an LCG indication field and a buffer size field, and wherein the LCG indication field indicates whether buffer size information for each LCG of eight LCGs is present, and the buffer size field comprises the buffer size information only for an LCG having available data according to in ascending priority order.

2. The method of claim 1, wherein the LCG indication field is configured in an 8-bit bitmap and indicates whether the buffer size information for each LCG is present.

3. The method of claim 1, wherein the buffer size field comprises eight bits for each LCG and comprises index information set according to buffer size information for each LCG, and the index information is mapped according to a range of buffer size information and is determined according to a preset table.

4. A method for receiving, by a base station, a Buffer Status Report (BSR), the method comprising:

receiving a BSR for all Logical Channel Groups (LCGs) having data available for uplink transmission, which is configured in a long BSR format, according to a trigger of a regular BSR or a periodic BSR by a terminal; and checking buffer size information for each LCG of the terminal on the basis of the BSR, wherein the BSR configured in the long BSR format comprises an LCG indication field and a buffer size field, and wherein the LCG indication field indicates whether the buffer size information for each LCG of eight LCGs is present, and the buffer size field comprises the buffer size information only for an LCG having available data according to in ascending priority order.

5. The method of claim 4, wherein the LCG indication field is configured in an 8-bit bitmap and indicates whether the buffer size information for each LCG is present.

6. The method of claim 4, wherein the buffer size field comprises eight bits for each LCG and comprises index information set according to buffer size information for each LCG, and the index information is mapped according to a range of buffer size information and is determined according to a preset table.

7. A terminal for transmitting a Buffer Status Report (BSR), the terminal comprising:

a controller configured to monitor whether a regular BSR or a periodic BSR is triggered, and to determine that a BSR format is a long BSR when there is data available for uplink transmission in more than one Logical Channel Groups (LCGs); and a transmitter configured to transmit, to a base station, a BSR for all LCGs having the data available for uplink transmission, which is configured in the long BSR format, when the regular BSR or the periodic BSR is triggered, wherein the BSR configured in the long BSR format comprises an LCG indication field and a buffer size field, and wherein the LCG indication field indicates whether buffer size information for each LCG of eight LCGs is present, and the buffer size field comprises the buffer size information only for an LCG having available data according to in ascending priority order.

8. The terminal of claim 7, wherein the LCG indication field is configured in an 8-bit bitmap and indicates whether the buffer size information for each LCG is present.

9. The terminal of claim 7, wherein the buffer size field comprises eight bits for each LCG and comprises index information set according to buffer size information for each LCG, and the index information is mapped according to a range of buffer size information and is determined according to a preset table.

* * * * *